United States Patent
Noguchi et al.

(10) Patent No.: US 9,028,695 B2
(45) Date of Patent: May 12, 2015

(54) PROCESS FOR PRODUCING RECLAIMED WATER AND SYSTEM FOR PRODUCING RECLAIMED WATER

(75) Inventors: Motoharu Noguchi, Tokyo (JP); Hideki Kozono, Tokyo (JP); Michiko Aoki, Tokyo (JP)

(73) Assignee: Metawater Co., Ltd., Chiyoda-Ku (JP)

( * ) Notice: Subject to any disclaimer, the term of this patent is extended or adjusted under 35 U.S.C. 154(b) by 195 days.

(21) Appl. No.: 13/240,543

(22) Filed: Sep. 22, 2011

(65) Prior Publication Data

US 2012/0031838 A1    Feb. 9, 2012

Related U.S. Application Data

(63) Continuation of application No. PCT/JP2010/053988, filed on Mar. 10, 2010.

(30) Foreign Application Priority Data

Mar. 27, 2009    (JP) ................................. 2009-080498

(51) Int. Cl.

| | |
|---|---|
| C02F 1/44 | (2006.01) |
| C02F 1/52 | (2006.01) |
| B01D 65/06 | (2006.01) |
| C02F 1/78 | (2006.01) |
| C02F 9/00 | (2006.01) |
| B01D 65/02 | (2006.01) |

(Continued)

(52) U.S. Cl.
CPC . *C02F 9/00* (2013.01); *B01D 65/02* (2013.01); *B01D 2321/168* (2013.01); *C02F 1/281* (2013.01); *C02F 1/444* (2013.01); *C02F 1/5236* (2013.01); *C02F 1/56* (2013.01); *C02F 1/78* (2013.01); *C02F 2103/20* (2013.01); *C02F 2209/03* (2013.01); *C02F 2209/11* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 5,114,576 | A | 5/1992 | Ditzler et al. |
| 2002/0104787 | A1 | 8/2002 | Murayama et al. |

(Continued)

FOREIGN PATENT DOCUMENTS

| | | |
|---|---|---|
| JP | 07-232197 A1 | 9/1995 |
| JP | 11-235587 A1 | 8/1999 |

(Continued)

OTHER PUBLICATIONS

Bhavana S. Karnick et al., "*Effects of Ozonation on the Permeate Flux of Nanocrystalline Ceramic Membranes,*" Water Research, vol. 39, No. 4, Feb. 1, 2005, pp. 728-734.

(Continued)

*Primary Examiner* — Dirk Bass
(74) *Attorney, Agent, or Firm* — Burr & Brown, PLLC

(57) ABSTRACT

The process includes operation as follows: putting ozone generated by an ozone generator into raw water, in a normal mode, to subject the raw water to ozone treatment; injecting a flocculant into the raw water before or after the ozone treatment; filtering the raw water by a separation membrane after the ozone treatment and the injection of the flocculant; and intermittently setting cleaning mode to put a larger quantity of cleaning ozone than that in the normal mode into the raw water so as to intermittently increase the concentration of dissolved ozone, thereby cleaning the filtration membrane.

9 Claims, 2 Drawing Sheets

(51) Int. Cl.
    *C02F 1/28*     (2006.01)
    *C02F 1/56*     (2006.01)
    *C02F 103/20*     (2006.01)

(56) References Cited

U.S. PATENT DOCUMENTS

| | | | |
|---|---|---|---|
| 2005/0139530 A1* | 6/2005 | Heiss | 210/85 |
| 2008/0217244 A1 | 9/2008 | Gaid | |
| 2008/0277340 A1 | 11/2008 | Hong et al. | |

FOREIGN PATENT DOCUMENTS

| | | | |
|---|---|---|---|
| JP | 2000-308812 A1 | 11/2000 | |
| JP | 2001-087764 A1 | 4/2001 | |
| JP | 2002-035552 A1 | 2/2002 | |
| JP | 2002-136981 A1 | 5/2002 | |
| JP | 2003-251376 A1 | 9/2003 | |
| JP | 3449248 B2 | 9/2003 | |
| JP | 2003-285059 A1 | 10/2003 | |
| JP | 2005-319375 A1 | 11/2005 | |
| WO | 00/27510 A1 | 5/2000 | |

OTHER PUBLICATIONS

Extended European Search Report dated Jul. 27, 2012.
Yali Song, et al., Water & Wastewater Engineering, Dec. 31, 2006, vol. 32, pp. 18-21.
Chinese Office Action dated May 21, 2013 (with English Summary of the Office Action).
Chinese Office Action dated Nov. 5, 2012 (with English translation).
European Office Action (Application No. 10 755 865.2) dated Feb. 6, 2015.

* cited by examiner

PROCESS FOR PRODUCING RECLAIMED WATER AND SYSTEM FOR PRODUCING RECLAIMED WATER

BACKGROUND OF THE INVENTION

1. Field of the Invention

The present invention relates to a process for producing reclaimed water and a system for producing reclaimed water whereby to obtain reclaimed water by using sewage effluent or various other types of treated wastewater as raw water.

2. Description of Related Art

To enhance efficient use of water resources, techniques for obtaining reclaimed water by subjecting various types of wastewater to membrane filtration have been developed. For example, Patent Documents 1 and 2 disclose methods for subjecting the washing wastewater in a filter basin of a water purifying plant to membrane filtration, thereby recycling the wastewater as washing water. In the case of the inventions described in these Patent Documents 1 and 2, the properties of wastewater are relatively good, but if wastewater contains a large quantity of fine solids, such as organic matters, as in the case of discharged sewage, then filtering the wastewater through a membrane causes the surface of the membrane to be fouled soon with fine solids, such as organic matters, in the wastewater, possibly leading to an operation failure.

As the techniques for preventing the membrane surface from fouling, there are methods whereby organic matters, which cause a membrane surface fouling, are decomposed by adding ozone to raw water, as disclosed in Patent Documents 3 and 4. However, a large quantity of ozone is required to fully decompose organic matters. An ozone generator, however, poses problems in that it is costly, consumes much electric power to generate ozone, and requires maintenance cost, resulting in high running cost.

Further, if a large quantity of ozone is added, then the decomposition of organic matters proceeds and the decomposed organic matters pass through a membrane, so that the concentration of the residual organic matters in the membrane-filtered water increases, causing a problem that the reclaimed water ends up with a deteriorated water quality. For these reasons, ozone has hardly been used to obtain reclaimed water by filtering wastewater through a membrane. The main objects of the inventions disclosed in both Patent Documents 3 and 4 are water purifying treatment process.

Patent document 5 describes a process for producing reclaimed water by subjecting secondary-treated sewage effluent to pre-ozone treatment process, biofiltration process, ozone treatment process, and membrane filtration process. This method, however, is not considered to be easily applicable to actual use because the method also requires a large quantity of ozone, and accidental inflow of the ozone from the pre-ozone treatment process to the biofiltration process caused by, for example, changes in the properties of raw water, would deteriorate the activity of the biofilm, possibly leading to a deteriorated quality of the treated water.

PRIOR ART DOCUMENTS

Patent Documents

Patent Document 1: JP-A-11-235587
Patent Document 2: JP-A-2001-87764
Patent Document 3: JP-A-2003-285059
Patent Document 4: JP-3449248
Patent Document 5: JP-A-2002-136981

The water quality is subjected to daily changes or seasonal changes. Further, load on the biological treatment (pretreatment) changes due to rainfall and the like, causing the quality of raw water (secondary effluent) to change. This means that, normally, the optimum ozone input does not remain constant since the wastewater properties (the water quality and water volume) or water temperature changes.

In order to maintain the ozone input constant, the ozone input is set to be slightly high to prevent shortage from taking place due to changes in the properties of wastewater. This leads to higher running cost of ozone equipment. The running cost of the ozone equipment could be reduced by controlling the ozone input according to the properties of wastewater, using the concentration of dissolved ozone or the like as an index. This method, however, may cause the membrane surface of a filteration membrane to gradually become tainted and eventually fouled due to a delay in control or a low set control value.

An object of the present invention is to provide a process for producing reclaimed water and a system for producing reclaimed water that allows reclaimed water to be stably obtained from wastewater without the need for a large quantity of ozone at all times while at the same time inexpensively preventing a membrane surface from fouling.

SUMMARY OF THE INVENTION

To solve the problems described above, the present inventors have discovered that putting cleaning ozone into raw water briefly makes it possible to prevent a separation membrane from fouling. In other words, the present invention provides a process for producing reclaimed water and a system for producing reclaimed water described below.

[1] A process for producing reclaimed water, including the operations of: in a normal mode, putting ozone generated by an ozone generator into raw water to subject the raw water to ozone treatment; injecting a flocculant into the raw water before or after the ozone treatment; filtering the raw water by a separation membrane after the ozone treatment and the injection of the flocculant; and intermittently setting a cleaning mode to put a larger quantity of cleaning ozone than in the normal mode into the raw water so as to intermittently increase the concentration of a dissolved ozone, thereby cleaning the filtration membrane.

[2] The process for producing reclaimed water described in the aforesaid [1], wherein a transmembrane pressure of the pressure difference between an upstream side and a downstream side of the separation membrane is measured, and in the case where an increasing speed of the transmembrane pressure exceeds a predetermined value, the cleaning ozone is put into the raw water thereby to intermittently increase the concentration of the dissolved ozone.

[3] The process for producing reclaimed water described in the aforesaid [2], wherein the turbidity of the raw water is measured, and in the case where the turbidity exceeds a predetermined value, the cleaning mode is not set.

[4] The process for producing reclaimed water described in the aforesaid [2] or [3], wherein an ozone input or ozone consumption in the normal mode is measured, and in the case where the ozone input or the ozone consumption exceeds a predetermined value, the cleaning mode is not set.

[5] A system for producing reclaimed water, comprising: an ozone processor with an ozone generator that generates ozone, and for to putting the ozone into raw water, in a normal mode, to carry out ozone treatment of the raw water and intermittently setting a cleaning mode to put a larger quantity of cleaning ozone than in the normal mode into the raw water so as to intermittently increase the concentration of dissolved ozone; a flocculant injection unit for injecting a flocculant into the raw water before or after the ozone treatment; and a membrane filtration unit located downstream of the ozone processor and the flocculant injection unit, and for carrying out membrane filtration of the raw water by a separation membrane.

[6] The system for producing reclaimed water described in the aforesaid [5], further comprising a transmembrane pressure measuring unit for measuring a transmembrane pressure of a pressure difference between an upstream side and a downstream side of the separation membrane, wherein the cleaning mode is set in the case where an increasing speed of the transmembrane pressure measured by the transmembrane pressure measuring unit exceeds a predetermined value, and the cleaning ozone is put into the raw water to intermittently increase the concentration of dissolved ozone.

[7] The system for producing reclaimed water described in the aforesaid [6], further comprising a turbidity measuring unit for measuring the turbidity of the raw water, wherein the cleaning mode is not set in the case where the turbidity measured by the turbidity measuring unit exceeds a predetermined value.

[8] The system for producing reclaimed water described in the aforesaid [6] or [7], wherein the cleaning mode is not set in the case where the quantity of the input ozone or the ozone consumption before passing through the separation membrane in the normal mode exceeds a predetermined value.

Ozone is put into raw water in the normal mode to carry out the ozone treatment on the raw water, and more cleaning ozone than that in the normal mode is put into the raw water in the cleaning mode to intermittently increase the concentration of the dissolved ozone so as to clean the separation membrane, thus permitting a reduced transmembrane pressure. This arrangement makes it possible to prevent the separation membrane from fouling and therefore to prolong the interval of chemical cleaning. Furthermore, since an increased quantity of ozone is intermittently generated, it is not required to generate a large quantity of ozone at all times. This makes it possible to reduce the running cost and also to prevent the separation membrane from clogging.

DETAILED DESCRIPTION OF THE INVENTION

Figure 1:
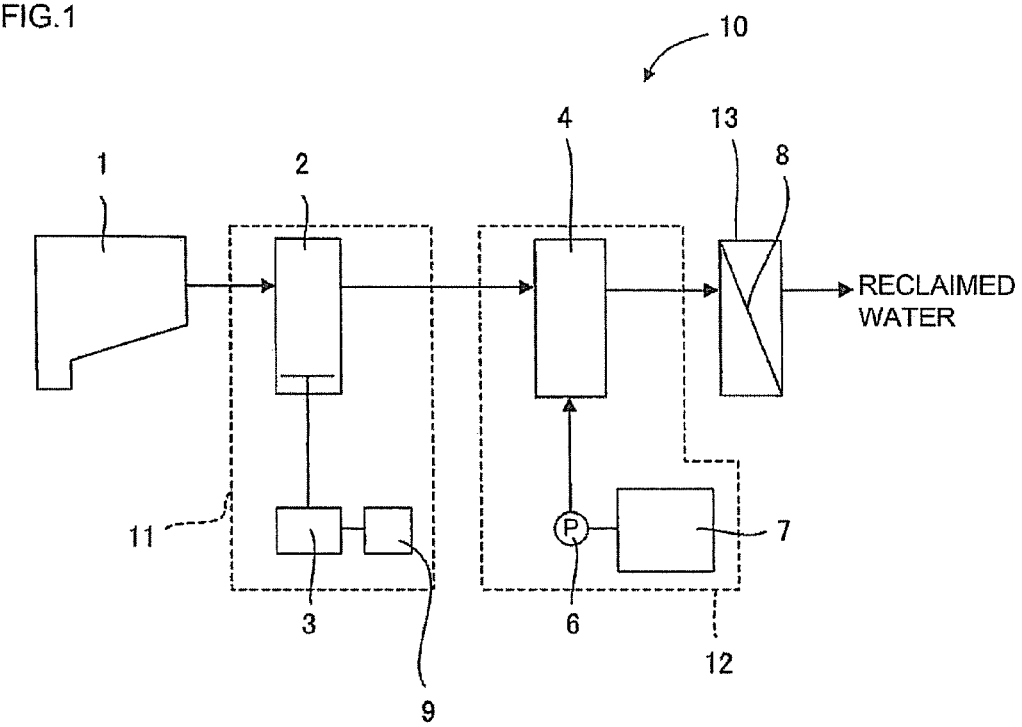
FIG. 1 is a diagram illustrating a system for producing reclaimed water according to embodiment 1 of the present invention.

The following will describe embodiments of the present invention with reference to the accompanying drawings. The present invention is not limited to the following embodiments, and a change, modification or improvement may be added as long as it does not depart from the scope of the invention.

Embodiment 1

A reclaimed water producing system 10 in accordance with the present invention includes an ozone processor 11 which has an ozone generator 3 which generates ozone, a flocculant injection unit 12 through which a flocculant is put into raw water before or after an ozone treatment, and a membrane filtration unit 13 which carries out membrane filtration on raw water by a separation membrane 8 and which is located at the downstream of the ozone processor 11 and the flocculant injection unit 12. The ozone processor 11 puts ozone into raw water in, a normal mode, to carry out the ozone treatment on the raw water, and intermittently sets a cleaning mode to put cleaning ozone in the cleaning mode in a larger quantity than that in the normal mode, thereby intermittently increasing the concentration of dissolved ozone.

FIG. 1 illustrates a system for producing reclaimed water according to embodiment 1 of the present invention. The system is constructed such that the wastewater discharged from a final sedimentation tank 1 of a sewage treatment plant is led to an ozone contact tower 2, a flocculation basin 4, and the separation membrane 8 of the membrane filtration unit 13. In the present embodiment, the wastewater, which is the raw water, is the treated sewage effluent of the final sedimentation tank 1 at the sewage treatment plant; however, the types of the wastewater are not limited thereto, and may include wastewater obtained by treating sidestreams, industrial wastewater, solid waste leachate, night soil, agricultural wastewater, livestock wastewater, cultivation wastewater, and the like or purified raw water.

The ozone contact tower 2 has the ozone generator 3, which supplies ozone, and an ozone controller 9 controls the supply of ozone. Thus, the ozone contact tower 2, the ozone generator 3, and the ozone controller 9 constitute the ozone processor 11.

The ozone generator 3 is not limited to any particular type as long as it generates ozone by a silent discharge method, an ultraviolet method, a chemical generation method, an electrolytic method, or the like. Preferably, however, the ozone generator 3 uses the silent discharge method in order to obtain a large quantity of ozone. When the power thereof is turned on, the ozone generator 3 generates ozone of a predetermined concentration, and raw water is brought into contact with the ozone, which is supplied from the ozone generator 3, in the ozone contact tower 2. In the present invention, there is no particular restriction to the means for the contact between raw water and ozone, and it may use an upflow type or a downflow type or may use a method in which ozone is ejected from a diffuser plate or a diffuser tube, or a method in which ozone is blown in the form of microscopic bubbles (nano-bubbles or micro-bubbles) by using an injector. The flocculation improvement effect on solid contents in the raw water by the ozone is observed in an extremely short time.

The ozone processor 11 is set to the normal mode or the cleaning mode according to the control conducted by the ozone controller 9. In the normal mode, ozone in a predetermined quantity is put into raw water to subject the raw water to ozone treatment. In the cleaning mode, cleaning ozone in a larger quantity than that in the normal mode is put into the raw water to intermittently increase the concentration of dissolved ozone. In other words, the output of the ozone generator 3 is temporarily increased (a voltage or current value is increased) thereby to increase the concentration of gas ozone. The concentration of the dissolved ozone is measured at a location between the ozone contact tower 2 and the membrane filtration unit 13.

The flocculation basin 4 is equipped with a flocculant storage tank 7 via a flocculant injection pump 6, and is constructed such that a flocculant is injected from the flocculant storage tank 7 by the flocculant injection pump 6. The flocculation basin 4, the flocculant injection pump 6, and the flocculant storage tank 7 constitute the flocculant injection unit 12. The types of the flocculant to be used include PAC, ferric chloride, aluminum sulfate, polymer flocculant, PSI (polysilica iron) flocculant, and the like. Wastewater is mixed with the flocculant in the flocculation basin 4 by fast stir or slow stir so as to form an aggregated flock. As an aggregating means, a line mixer may be used.

The membrane filtration unit 13 has the separation membrane 8. For the separation membrane 8, an MF membrane or a UF membrane may be used. The good flock prepared in the preceding step minimizes the possibility of the fouling of the membrane surface. In addition, the ozone processor 11 puts the cleaning ozone into the raw water in the cleaning mode so as to intermittently increase the concentration of the dissolved ozone, thus cleaning the separation membrane 8 by the enhanced dissolved ozone. The membrane may be made of a polymer material or ceramic material and may have a monolith, tubular, honeycomb, hollow-fiber, or flat form of membrane. Further, the membrane may be an internal-pressure type or an external-pressure type. Further, the membrane filtration method may be a dead-end filtration method or a cross-flow method.

The process for producing reclaimed water in accordance with the present invention includes an operation in a normal mode in which ozone generated by the ozone generator 3 is put into raw water to treat the raw water with the ozone, a flocculant is injected into the raw water before or after the ozone treatment, and the raw water is subjected to membrane filtration using the separation membrane 8 after the ozone treatment and the injection of the flocculant. Further, the cleaning mode is intermittently set to supply more cleaning ozone to the raw water in the cleaning mode than that in the normal mode so as to intermittently increase the concentration of the dissolved ozone, thereby cleaning the filtration membrane.

Figure 2:
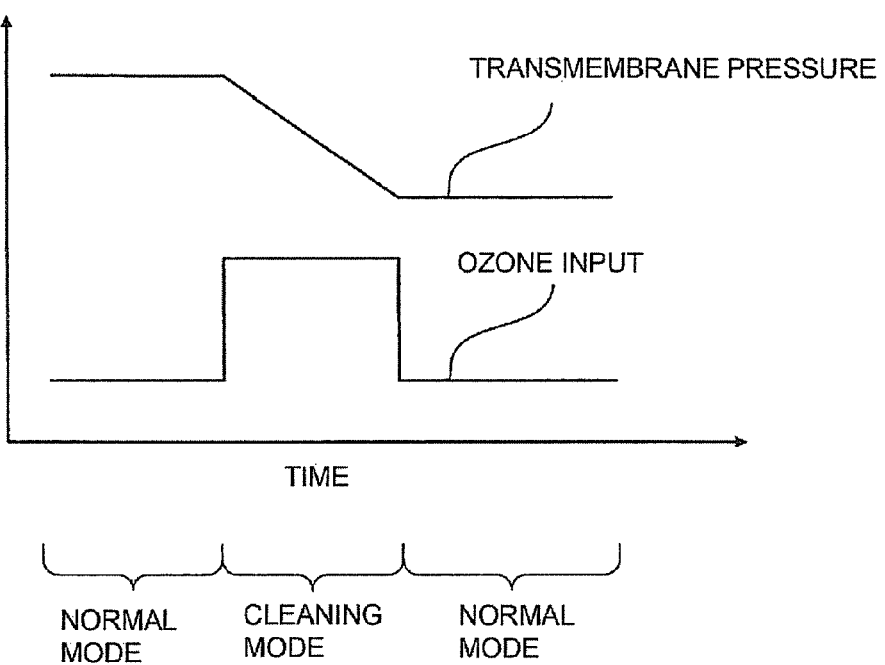
FIG. 2 is a graph illustrating an ozone input in a cleaning mode.

First, the wastewater discharged from the final sedimentation tank 1 at a sewage treatment plant is introduced into the ozone contact tower 2. Between the final sedimentation tank 1 and the ozone contact tower 2, a biological treatment, such as biofiltration or bioparticle method, or a simple filtration device using sand filtration, fiber filtration or the like may be installed. The ozone added to the discharged wastewater in the ozone contact tower 2 comes in contact with fine solids contained in the wastewater, thereby modifying the surface electrical charge of the fine solids to be easy to flocculate. As illustrated in FIG. 2, in the reclaimed water producing system 10, the ozone controller 9 of the ozone processor 11 supplies the cleaning ozone to the raw water to intermittently increase the concentration of the dissolved ozone so as to clean the separation membrane 8, thus preventing the separation membrane 8 from fouling. The transmembrane pressure in FIG. 2 is the pressure difference between the upstream side and the downstream side of the separation membrane 8. Temporarily increasing the ozone input makes it possible to clean the separation membrane 8 so as to decrease the transmembrane pressure.

It is possible to carry out control such that the intermittent supply of the cleaning ozone in the ozone contact tower 2 is effected at predetermined intervals for water, the influent quality of which varies relatively less. Alternatively, the following control can be implemented. In the case of, for example, sewage influent water, the water quality varies relatively less, but the flow rate and the concentration thereof vary during the day, the varying pattern being approximately constant. The concentration of the pollution material in sewage influent generally becomes high from daytime to night, while it generally becomes low from midnight to morning. The water detention time at a treatment plant is approximately half a day, so that the sewage effluent quality becomes high from midnight to morning, while it becomes low from daytime to night. According to this trend, the ozone generator 3 develops an allowance in its capability during the time zone from daytime to night when the water quality is relatively good. By taking this advantage of the time zone, the concentration of the dissolved ozone is increased to clean a membrane surface.

Embodiments 2 and 3

Figure 3:
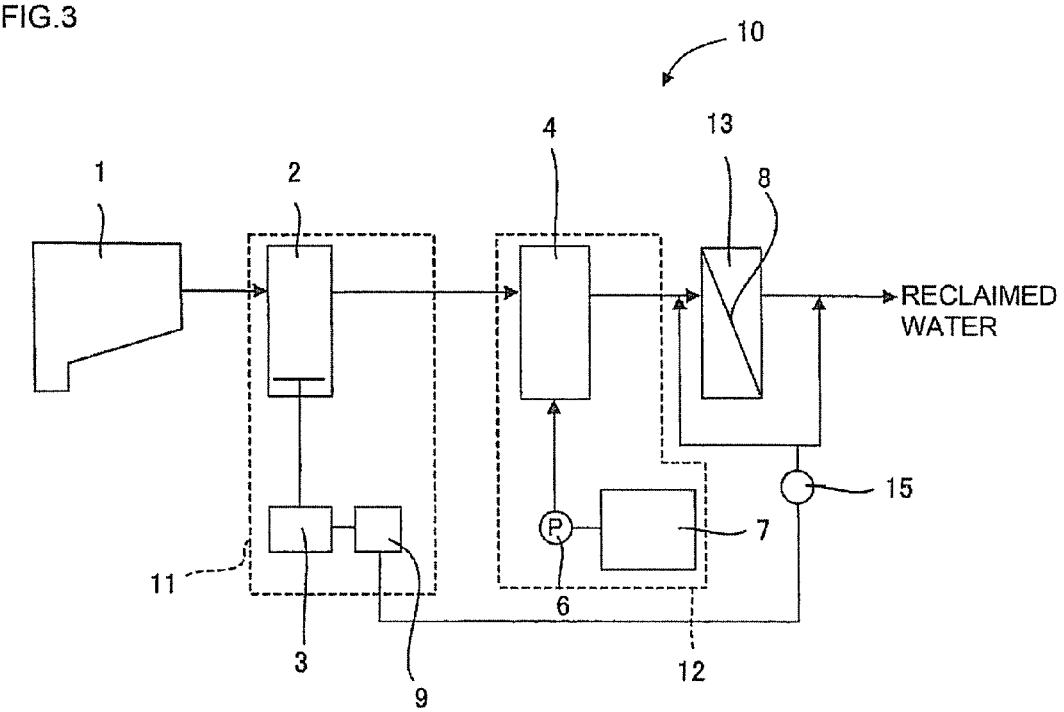
FIG. 3 is a diagram illustrating a system for producing reclaimed water according to embodiment 2 of the present invention.
Figure 4:
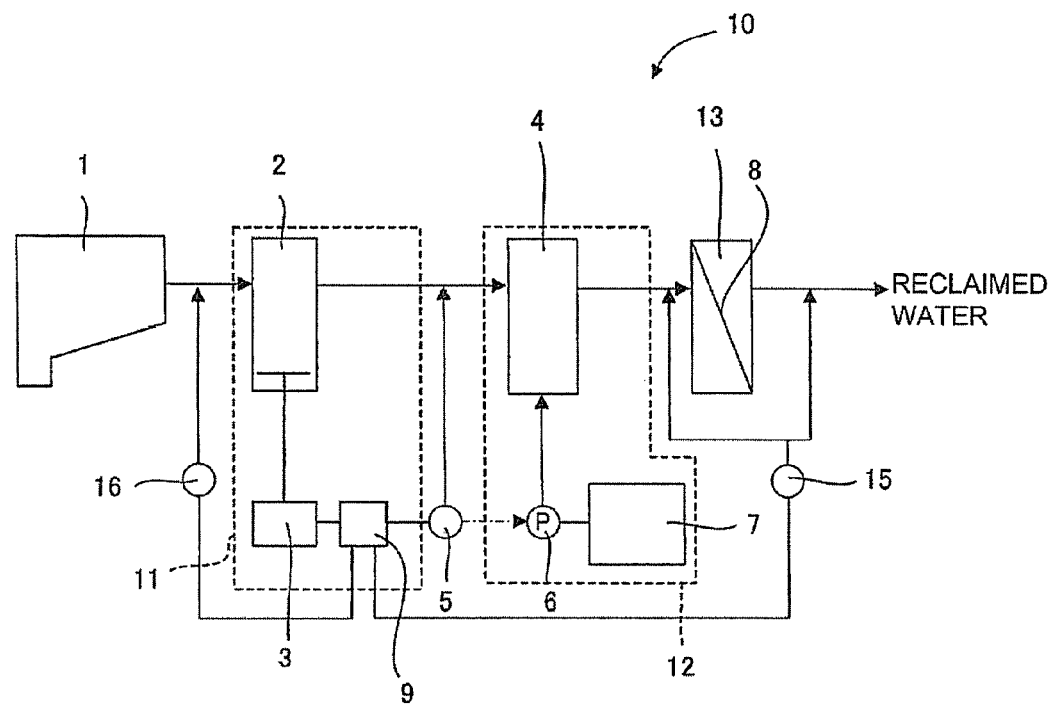
FIG. 4 is a diagram illustrating a system for producing reclaimed water according to embodiment 3 of the present invention.

FIG. 3 illustrates a reclaimed water producing system 10 according to embodiment 2 of the present invention, and FIG. 4 illustrates a reclaimed water producing system 10 according to embodiment 3.

The reclaimed water producing system 10 according to embodiment 2 in FIG. 3 has a transmembrane pressure measuring unit 15, which measures the transmembrane pressure of the pressure difference between the upstream side and the downstream side of a separation membrane 8. In the case where the increasing speed of the transmembrane pressure measured by the transmembrane pressure measuring unit 15 exceeds a predetermined value, a cleaning mode is set to put cleaning ozone into raw water thereby to intermittently increase the concentration of dissolved ozone. As the value of the transmembrane pressure, a value corrected on the basis of a water temperature or a height (correction based on the different in the installation height of a pressure gauge) may be used.

The reclaimed water producing system 10 according to embodiment 3 in FIG. 4 has a turbidity measuring unit 16 for measuring the turbidity of raw water. The turbidity measured by the turbidity measuring unit 16 is input to an ozone controller 9. An arrangement can be made such that a cleaning mode is not set if the turbidity measured by the turbidity measuring unit 16 exceeds a predetermined value. Further, a dissolved ozone concentration measuring unit 5 is also provided to measure the concentration of dissolved ozone before passage through a separation membrane 8. An arrangement can be made such that the cleaning mode is not set if the quantity of supplied ozone or ozone consumption in a normal mode exceeds a predetermined value. To be more specific, an arrangement is made such that an ozone controller 9 changes the quantity of input ozone on the basis of the turbidity measured by the turbidity measuring unit 16 and sets the cleaning mode if the quantity of input ozone is a predetermined value or less. Alternatively, the ozone consumption is detected, and if the ozone consumption is a predetermined value or less, then the cleaning mode is set. With these arrangements, in the case of, for example, river water, the raw water quality of which is usually stable, whereas the raw water quality suddenly worsens due to rainfall or the like and the rising speed of the transmembrane pressure increases, the concentration of dissolved ozone can be increased to lower the transmembrane pressure after the raw water quality becomes acceptable. Incidentally, the system may be constructed to have one of the turbidity measuring unit 16 and the dissolved ozone concentration measuring unit 5. Further, the quantity of input ozone and the ozone consumption are determined from the concentration of input ozone/the concentration of discharged ozone/the flow rate of ozone gas/the flow rate of a liquid to be treated; however, if the flow rate of ozone gas/the flow rate of the liquid to be treated is approximately fixed, then the above factors may be omitted in calculation, and the concentration of input ozone or the value obtained by subtracting the concentration of discharged ozone from the concentration of input ozone can be used as an index.

Further, the system can be constructed such that a flocculant injection pump 6 is controlled on the basis of the measured value of the concentration of dissolved ozone provided by the dissolved ozone concentration measuring unit 5, which measured the concentration of the dissolved ozone in wastewater, so as to control the injection of the flocculant.

A description will now be given of the method for operating the reclaimed water producing systems 10 according to embodiments 2 and 3. As with embodiment 1, the wastewater discharged from a final sedimentation tank 1 of a sewage treatment plant is introduced into an ozone contact tower 2. The membrane cleaning interval (the interval for supplying cleaning ozone) may be determined on the basis of a transmembrane pressure rising speed and the concentration of dissolved ozone, which is changed by pulses. The membrane cleaning interval may be once every 1 to 10 days, and can be controlled, for example, as shown in Table 1 below. The transmembrane pressure rising speed is defined as follows. At a membrane filtration unit 13, the transmembrane pressure (the pressure difference between a raw water side and a treated water side) is periodically measured. In membrane separation, backwash is periodically carried out. The transmembrane pressure immediately after the backwash (initial transmembrane pressure) is plotted on the basis of elapsed time to determine the transmembrane pressure rising speed from the obtained gradient. For example, a transmembrane pressure rising speed of 1 kPa/day indicates that the initial transmembrane pressure rises in increments of 1 kPa per day.

TABLE 1

| | Transmembrane pressure rising speed | | |
|---|---|---|---|
| | 0.2 kPa/day | 0.5 kPa/day | 1.0 kPa/day |
| Adding for dissolved ozone concentration of 1 mg/L | For 1 hr once every 5 days | For 1 hr once every 2 days | For 1 hr once per day |
| Adding for dissolved ozone concentration of 2 mg/L | For 0.5 hr once every 5 days | For 0.5 hr once every 2 days | For 0.5 hr once per day |

An example in which the transmembrane pressure rising speed is 0.2 kPa/day will be described. The rise in the transmembrane pressure can be restrained to allow stable membrane filtration for an extended period of time by adding the cleaning ozone for one hour once every 5 days in the case where the cleaning ozone is added such that the concentration of the dissolved ozone will be 1 mg/L, or by adding the cleaning ozone for 0.5 hours once every 5 days in the case where the cleaning ozone is added such that the concentration of the dissolved ozone will be 2 mg/L.

In the case where the system is provided with the dissolved ozone concentration measuring unit 5 or the turbidity measuring unit 16, as with embodiment 3, if a bad quality of influent water prevents the concentration of the dissolved ozone from being periodically increased, then a few cycles may be implemented together at one time. Further, the time during which the concentration of the dissolved ozone is increased may be prolonged.

As with, for example, river water, there are cases where the raw water quality is usually stable, but the raw water quality suddenly worsens due to a rainfall or the like, causing the rising speed of the transmembrane pressure to increase. In this case, the concentration of the dissolved ozone is increased to decrease the transmembrane pressure after the raw water quality becomes acceptable. Whether the raw water quality has become acceptable can be determined by checking the raw water turbidity or the ozone input (in the case where the concentration of the dissolved ozone is controlled).

As described above, the raw water, the aggregability of solids of which has been enhanced by the contact with ozone in the ozone contact tower 2, is sent to a flocculation basin 4. The concentration of the dissolved ozone in the raw water before the flocculation is measured by a dissolved ozone concentration meter 5.

When a flocculant is put into the raw water, the aggregability of which has been improved by ozone as described above, the solids in the raw water promptly flocculate, forming a flock. If the concentration of the dissolved ozone in the raw water before the flocculation decreases due to bad properties of the raw water and high consumption of ozone, then injecting more flocculant also causes a good flock to be formed. Thereafter, membrane filtration is carried out by the separation membrane 8, and membrane-filtered water is taken out as reclaimed water.

In the above embodiments, the examples wherein the flocculant injection unit 12 is installed at the downstream side of the ozone processor 11 have been described. Alternatively, however, the system may be constructed such that the ozone processor 11 is installed at the downstream side of the flocculant injection unit 12. This arrangement makes it possible to reduce the consumption of ozone, because it is required to carry out ozone treatment only on the solids that have not formed a flock in reaction to the injected flocculant in the flocculation basin 4.

EXAMPLES

The following will describe the present invention in further detail with reference to examples; however, the present invention is not limited to the examples.

(Test 1)

In a reclaimed water producing system 10, which treats raw water by passing the raw water through an ozone contact tower 2, a flocculation basin 4, and a membrane filtration unit 13 in this order, the concentration of dissolved ozone was changed for one hour to check the improvement rate of the transmembrane pressure, as shown in Table 2. As indicated by comparative example 1, the transmembrane pressure was not improved when the concentration of the dissolved ozone was 0.75 mgO$_3$/L. Meanwhile, when the concentration of the dissolved ozone was 1.0 mgO$_3$/L, as in example 1, the improvement rate of the transmembrane pressure was 1.5 kPa/hr, and when the concentration of the dissolved ozone was 2.0 mgO$_3$/L, as in embodiment 2, the improvement rate of the transmembrane pressure was 2.5 kPa/hr.

TABLE 2

| | Comparative Example 1 | Example 1 | Example 2 |
|---|---|---|---|
| Concentration of dissolved ozone | 0.75 mgO$_3$/L | 1.0 mgO$_3$/L | 2.0 mgO$_3$/L |
| Improvement rate of transmembrane pressure | 0 kPa/hr | 1.5 kPa/hr | 2.5 kPa/hr |

[Test 2]

As indicated by comparative example 2 in Table 3, when the concentration of the dissolved ozone was fixed to 0.75 mgO$_3$/L, chemical cleaning had to be carried out on the separation membrane 8 once every 90 days. Meanwhile, as indicated by example 3, increasing the concentration of the dissolved ozone to 1.0 mgO₃/L for one hour per day made it possible to extend the interval of the chemical cleaning to 120 days. Further, as indicated by example 4, increasing the concentration of the dissolved ozone to 2.0 mgO₃/L for one hour once in every two days also made it possible to extend the interval of the chemical cleaning to 120 days.

TABLE 3

|  | Comparative Example 2 | Example 3 | Example 4 |
|---|---|---|---|
| Concentration of dissolved ozone | 0.75 mgO₃/L Fixed | 1.0 mgO₃/L Increased for 1 hr per day | 2.0 mgO₃/L Increased for 1 hr once in every 2 days |
| Interval of chemical cleaning | 90 days | 120 days | 120 days |

PAC1: 3 mg-Al/L
(PAC1 input based on aluminum contained in PAC1)

As described above, it has been found that the transmembrane pressure drops when the system is run with an increased concentration of the dissolved ozone when the ozone generator 3 has a capability allowance. Thus, the system can be stably operated for an extended period of time without the need for adding ozone of a high concentration at all time.

INDUSTRIAL APPLICABILITY

The system for producing reclaimed water in accordance with the present invention can be applied to the treatment of treated sewage effluent, sidestreams, industrial wastewater, solid waste leachate, night soil, agricultural wastewater, livestock wastewater, cultivation wastewater, purified raw water and the like.

DESCRIPTION OF REFERENCE NUMERALS

1: final sedimentation tank; 2: ozone contact tower; 3: ozone generator; 4: flocculation basin; 5: dissolved ozone concentration measuring unit; 6: flocculant injection pump; 7: flocculant storage tank; 8: separation membrane; 9: ozone controller; 10: reclaimed water producing system; 11: ozone processor; 12: flocculant injection unit; 13: membrane filtration unit; 15: transmembrane pressure measuring unit; and 16: turbidity measuring unit.

The invention claimed is:

1. A process for producing reclaimed water, comprising the operations of:
   in a normal mode, putting ozone generated by an ozone generator into raw water to subject the raw water to ozone treatment;
   injecting a flocculant into the raw water after the ozone treatment;
   filtering the raw water by a separation membrane after the ozone treatment and the injection of the flocculant;
   measuring a transmembrane pressure, which is a pressure difference between an upstream side and a downstream side of the separation membrane, by measuring a gauge pressure and correcting the measured gauge pressure for at least one of a water temperature and an installed height difference of a pressure gauge,
   intermittently setting a cleaning mode to put a larger quantity of cleaning ozone than in the normal mode into the raw water so as to intermittently increase the concentration of a dissolved ozone, thereby cleaning the filtration membrane,
   determining a transmembrane rising speed by periodically measuring the transmembrane pressure immediately after backwashing the separation membrane and plotting the measured transmembrane pressure over time to determine when to inject the larger quantity of cleaning ozone in the cleaning mode,
   wherein when the transmembrane rising speed exceeds a first predetermined value, the ozone processor sets the cleaning mode to inject one of a first larger quantity of the ozone for a first predetermined time period and a second larger quantity of the ozone for a second predetermined time period, where the first larger quantity of the ozone is less than the second larger quantity of the ozone and the first predetermined time period is longer than the second predetermined time period.

2. The process for producing reclaimed water according to claim 1, wherein the turbidity of the raw water is measured, and in the case where the turbidity exceeds a predetermined value, the cleaning mode is not set.

3. The process for producing reclaimed water according to claim 1, wherein the quantity of input ozone or ozone consumption in the normal mode is measured, and in the case where the quantity of the input ozone or the ozone consumption exceeds a predetermined value, the cleaning mode is not set.

4. A system for producing reclaimed water, comprising:
   an ozone processor with an ozone generator that generates ozone, for putting the ozone into raw water, in a normal mode, to carry out ozone treatment of the raw water, and for intermittently setting a cleaning mode to put a larger quantity of cleaning ozone than in the normal mode into the raw water so as to intermittently increase the concentration of dissolved ozone;
   a flocculant injection unit for injecting a flocculant into the raw water after the ozone treatment;
   a membrane filtration unit located at the downstream of the ozone processor and the flocculant injection unit, and for carrying out membrane filtration of the raw water by a separation membrane, and
   means for measuring a transmembrane pressure, which is a pressure difference between an upstream side and a downstream side of the separation membrane, wherein a transmembrane rising speed is determined by periodically measuring a transmembrane pressure immediately after backwashing the separation membrane and plotting the measured transmembrane pressure over time to determine when to inject the larger quantity of cleaning ozone in the cleaning mode,
   wherein when the transmembrane rising speed exceeds a first predetermined value, the ozone processor sets the cleaning mode to inject one of a first larger quantity of the ozone for a first predetermined time period and a second larger quantity of the ozone for a second predetermined time period, where the first larger quantity of the ozone is less than the second larger quantity of the ozone and the first predetermined time period is longer than the second predetermined time period, and
   wherein the means for measuring the transmembrane pressure measures a gauge pressure, and corrects the measured gauge pressure for at least one of a water temperature and an installed height difference of a pressure gauge.

5. The system for producing reclaimed water according to claim 4, further comprising a turbidity measuring unit for measuring the turbidity of the raw water, wherein the cleaning ozone is not put into the raw water when the turbidity measured by the turbidity measuring unit exceeds a predetermined value.

6. The system for producing reclaimed water according to claim 4, wherein the ozone processor does not set the cleaning mode by said means for measuring a transmembrane pressure when the quantity of the input ozone or the ozone consumption in the normal mode exceeds a predetermined value.

7. The process for producing reclaimed water according to claim 2, wherein the quantity of input ozone or ozone consumption in the normal mode is measured, and in the case where the quantity of the input ozone or the ozone consumption exceeds a predetermined value, the cleaning mode is not set.

8. The system for producing reclaimed water according to claim 5, wherein the ozone processor does not set the cleaning mode by said means for measuring a transmembrane pressure when the quantity of the input ozone or the ozone consumption in the normal mode exceeds a predetermined value.

9. The system for producing reclaimed water comprising:
- an ozone processor with an ozone generator that generates ozone, and for to putting the ozone into raw water, in a normal mode, to carry out ozone treatment of the raw water, and for intermittently setting a cleaning mode to put a larger quantity of cleaning ozone than in the normal mode into the raw water so as to intermittently increase the concentration of dissolved ozone;
- a flocculant injection unit for injecting a flocculant into the raw water after the ozone treatment;
- a membrane filtration unit located at the downstream of the ozone processor and the flocculant injection unit, and for carrying out membrane filtration of the raw water by a separation membrane, and
- means for measuring a transmembrane pressure, which is a pressure difference between an upstream side and a downstream side of the separation membrane, wherein a transmembrane rising speed is determined by periodically measuring a transmembrane pressure immediately after backwashing the separation membrane and plotting the measured transmembrane pressure over time to determine when to inject the larger quantity of cleaning ozone in the cleaning mode,
- wherein when the transmembrane rising speed exceeds a first predetermined value, the ozone processor sets the cleaning mode to inject one of a first larger quantity of the ozone for a first predetermined time period and a second larger quantity of the ozone for a second predetermined time period, where the first larger quantity of the ozone is less than the second larger quantity of the ozone and the first predetermined time period is longer than the second predetermined time period, and
- wherein a dissolved concentration of the ozone in the ozone treated raw water is measured and an amount of the flocculant injected by the flocculant injection unit is determined on a basis of the measured dissolved ozone concentration.

* * * * *